Nov. 22, 1932.　　　　　　A. HUND　　　　　　1,888,555
SYSTEM OF ELECTRICAL DISTRIBUTION
Filed April 16, 1931　　　2 Sheets-Sheet 2
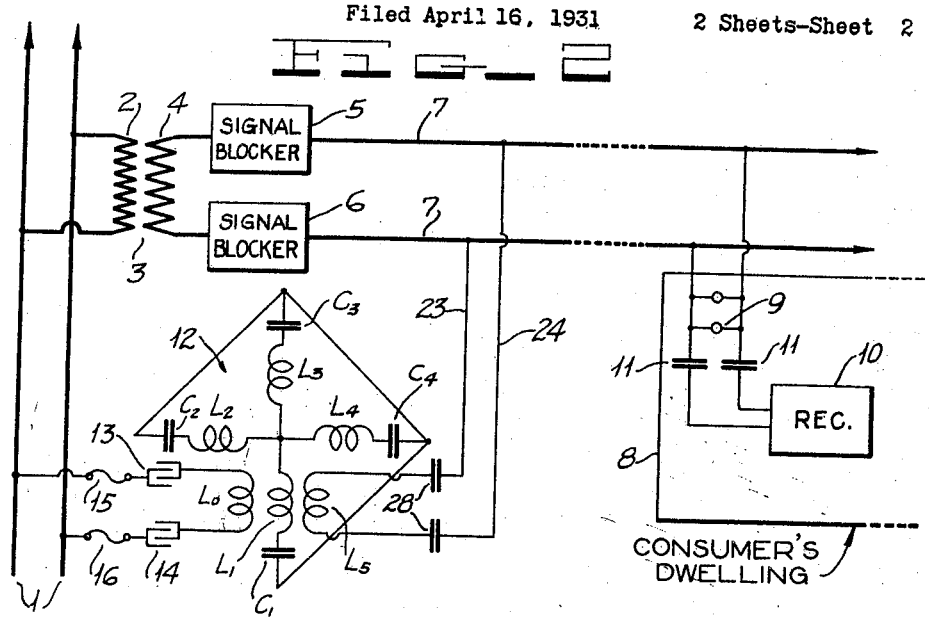
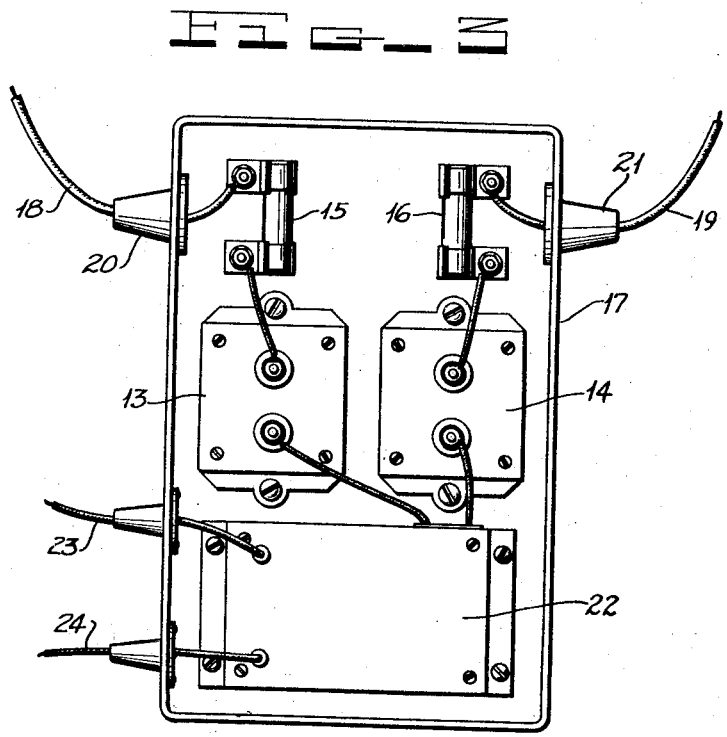
INVENTOR
August Hund
BY
ATTORNEY Patented Nov. 22, 1932

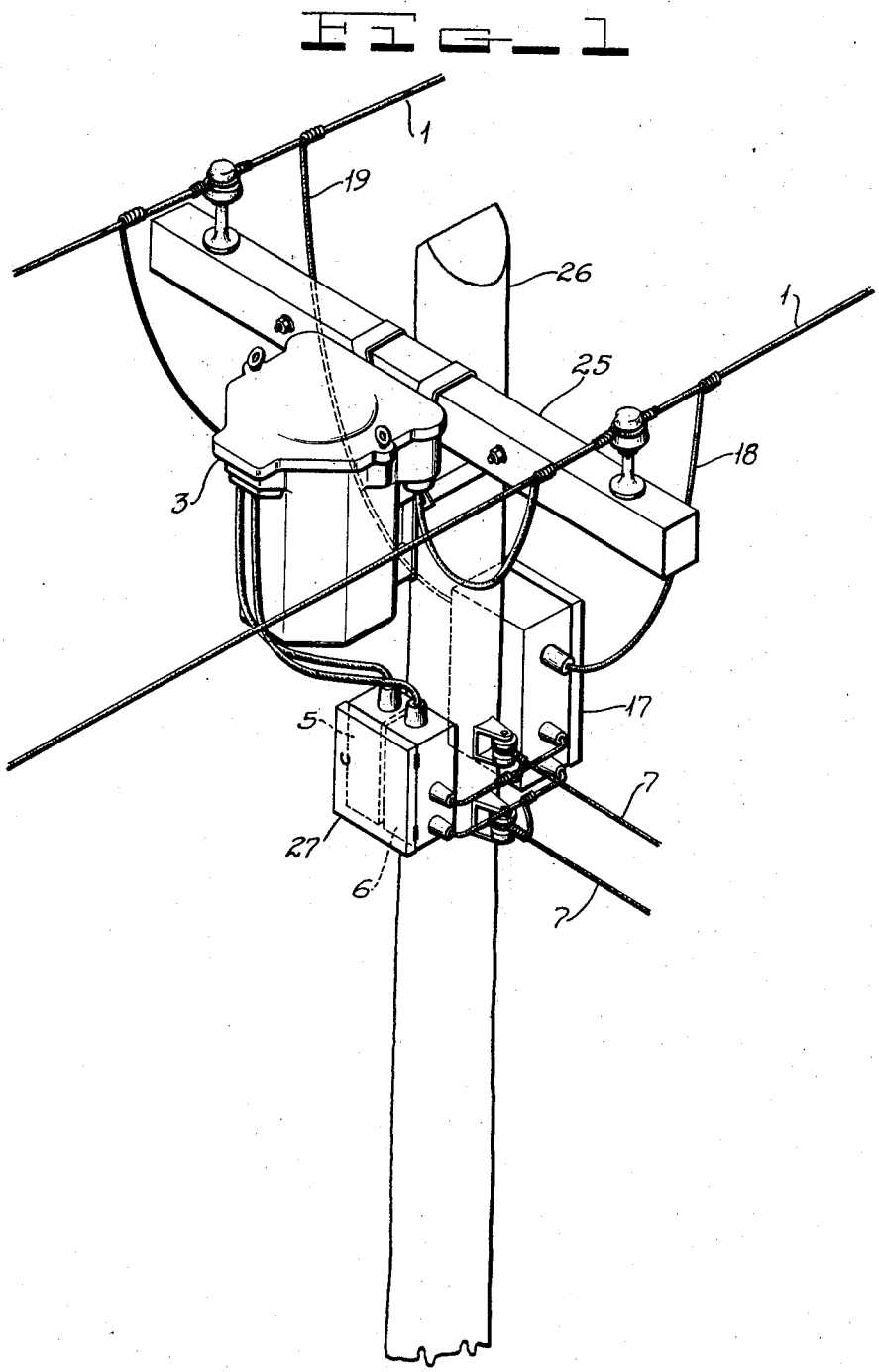

1,888,555

UNITED STATES PATENT OFFICE

AUGUST HUND, OF WEST ORANGE, NEW JERSEY, ASSIGNOR TO WIRED RADIO, INC., OF NEW YORK, N. Y., A CORPORATION OF DELAWARE

SYSTEM OF ELECTRICAL DISTRIBUTION

Application filed April 16, 1931. Serial No. 530,715.

My invention pertains in general to systems of electrical distribution and specifically relates to a system for distributing commercial power and carrier frequency energy.

In the system of wired radio broadcasting in which carrier frequency energy is impressed on commercial light and power distribution networks, it has been found that the power distribution transformers, such as the step-down transformers provided to obtain consumer's voltages of the order of 110–220 volts from the high voltage transmission lines, produce hum modulation of the carrier frequency current and other undesirable effects which disturb the quality of wired radio reception.

The principal object of my invention consists in producing a system of electrical distribution for wired radio broadcasting in which carrier frequency energy at a plurality of discrete frequency ranges is transmitted around and not through power transformers by a series of resonant circuits.

A further object of my invention consists in providing a system of distribution for both commercial power and carrier frequency energy over secondary wire lines in which the modulation of carrier frequency energy by the power transformer is avoided.

I accomplish the above desirable objects in a novel system of electrical distribution employing a high frequency filter system in association with a commercial power transformer.

In the drawings which accompany and form a part of this specification and in which like reference numerals designate corresponding parts throughout:

Fig. 1 is a general view of the typical installation of apparatus employed in the system of electrical distribution of my invention;

Fig. 2 is a diagrammatic representation of one embodiment of my system of electrical distribution; and Fig. 3 is a sectional view showing the contents and arrangement of a filter unit employed in my system.

My invention contemplates providing a system of resonant circuits for feeding carrier frequency energy around power transformers in secondary power lines while preventing transfer of carrier frequency energy to the secondary lines by the transformer. According to my invention, the secondary lines, such as those leading to a consumer's dwelling, are supplied with carrier frequency energy from a carrier frequency energy transfer system connecting the secondary lines and high voltage power transmission lines. This carrier frequency system, in combination with signal blockers connected in the output of the transformer, prevents extraneous modulation, by the power transformers, of the carrier frequency energy transmitted to the consumers' wired radio receivers.

Referring to the drawings in detail, and particularly to Fig. 2, power lines 1 are connected to the primary winding 2 of a power distribution transformer 3. The transformer 3 is of the iron-core step-down type for producing consumers' voltages of the order of 120–220 volts. The power lines 1 are indicative of a commercial power distribution network upon which carrier frequency energy is impressed for simultaneous transmission of several programs at several different superaudible frequencies. The lines 1 are connected to a source of commercial power and to means for supplying carrier frequency energy within several predetermined high frequency ranges for selective program reception by selective filter systems as employed in wired radio broadcasting.

A secondary winding 4 is electromagnetically coupled to the primary winding 2 for the transfer of commercial power at reduced voltage. The secondary winding 4 is connected through two signal blockers 5 and 6 to the secondary wire lines 7. The secondary wire lines 7 are connected to a consumer's dwelling, such as the consumer's dwelling 8, wherein commercial power consuming devices, indicated as lamps 9, and a wired radio receiver 10 are connected to the lines. The condensers 11 are interposed in the connections to the receiver 10 to prevent the passage of commercial power into the signal reception circuits of the receiver 10. The signal blockers 5 and 6 comprise means well known in the art, such as choke coils or circuits using parallel resonance, for permitting passage of commercial power, but which prevent the passage of carrier frequency energy. It is evident, then, that only commercial power is available at the output of the signal blockers 5 and 6.

According to my invention I employ a carrier frequency transfer system 12 which includes a group of parallel connected resonant circuits comprising the capacitances $C_1$, $C_2$, $C_3$, and $C_4$, and the inductances $L_1$, $L_2$, $L_3$, and $L_4$ respectively in series therewith. The inductance $L_1$ is electromagnetically coupled to an inductance $L_0$ which is connected through high voltage coupling condensers 13 and 14 and fuses 15 and 16 to high voltage power lines 1. Another inductance $L_5$ is connected to the secondary lines 7 also electromagnetically coupled to the inductance $L_1$. The inductances $L_0$, $L_1$, and $L_5$ in effect form an air-core transformer. Condensers 28 are provided in the lines 23 and 24 for preventing commercial power from feeding into the inductance $L_5$.

In the operation of my system, the circuits $C_1-L_1$ and $L_2-C_2$ are adjusted for one of the program carrier frequencies which will be designated as $f_1$. Then $$f_1 = \frac{\omega_1}{2\pi}$$

That is,
$$\omega_1^2 C_1 L_1 = 1, \text{ and } \omega_1^2 C_2 L_2 = 1.$$

The circuit $C_1 L_1 L_3 C_3$ is adjusted for reception of another of the program frequency ranges which will be designated as frequency $f_2$. Then $$f_2 = \frac{\omega_2}{2\pi}$$

that is
$$\omega_2^2 (L_1 + L_3) \frac{C_1 C_3}{C_1 + C_3} = 1.$$

The circuit $C_1 L_1 L_4 C_4$ is adjusted for reception of a program transmitted over another carrier frequency range which will be designated as $f_3$. Then $$f_3 = \frac{\omega_3}{2\pi}$$

that is
$$\omega_3^2 (L_1 + L_4) \frac{C_1 C_4}{C_1 + C_4} = 1.$$

Since the value of inductance $L_1$ is contained in all of the equations for the adjustment of all three carrier frequency ranges, this inductance can be used for picking up the carrier frequency energy at all of the program frequency ranges as well as for transferring these frequency ranges to the output inductance $L_5$. That is, these resonant circuits are, in effect, a network for the selective transmission of the program carrier frequency ranges from the high voltage lines 1 to the secondary lines 7. It will be, of course, obvious that my invention is not limited to the number of resonant circuits shown and that more extensive systems can be employed in accordance with my invention for the transfer of carrier frequency energy from primary to secondary lines at more than three discrete program modulated carrier frequency ranges.

The carrier frequency transfer system 12, as well as the associated components including the coupling condensers 13 and 14, and fuses 15 and 16, are mounted in a unitary housing 17, as shown in Fig. 3. The fuses 15 and 16 are connected to lead wires 18 and 19, respectively, which extend through insulators 20 and 21 in the housing 17. A casing 22 is mounted in the bottom of the housing 17 and contains the transfer system 12 and inductances $L_0$ and $L_5$. Leads 23 and 24 extend from the casing 22.

Fig. 1 depicts the practical installation of the apparatus of my invention. The power transformer 3 is mounted upon a cross arm 25 secured to the pole 26. The power lines 1 are connected to insulators mounted on the cross arm 25 and have leads extending to the transformer 3. The signal blockers 5 and 6 are mounted in a unitary housing 27 secured to the pole 26 directly beneath the transformer 3. The housing 17 is mounted upon the pole 26 diametrically opposite the housing 27. The secondary lines 7 are connected to insulators on the pole 26 and extend to the consumer's dwelling for supplying both commercial power and carrier frequency energy in accordance with the system of my invention.

It will now be obvious that I have provided a system for distribution of both commercial power and carrier frequency energy at several different frequency ranges which offers particular advantages in its use. Especial among these advantages is the avoidance of transformer modulation of the carrier frequency energy as well as selective transfer of the program modulated carrier frequency ranges from primary to secondary lines thus reducing extraneous electrical effects at frequencies other than those lying within the program frequency ranges. Although I have shown a preferred embodiment of my invention, I do not wish to be limited thereto except insofar as may be pointed out in the appended claims.

What I claim as new and original and desire to secure by Letters Patent of the United States is:

1. In a system for the transfer of alternating currents, an input circuit for supplying alternating currents at a plurality of discrete frequencies, an output circuit, and a network including a plurality of differently resonant selection circuits each formed in part by an element common to all of said selection circuits, said element being mutually coupled with said input and output circuits.

2. In a system for transferring electrical frequencies from one circuit to another, a circuit for supplying alternating currents at a plurality of discrete frequencies, a second circuit for the utilization of certain of said frequencies, and means for selecting frequencies in said first mentioned circuit for transfer to said second mentioned circuit comprising, a reactance element mutually coupled with said circuits, and a plurality of groups of reactance elements each group of which is adjusted in combination with said first mentioned reactance element for causing the effective transfer of a particular one of said frequencies between said circuits.

3. In a system for transfer of alternating currents at a plurality of discrete frequencies, an input circuit including an inductance for supplying a plurality of discrete frequencies, a utilization circuit including an inductance, a transfer inductance mutually coupled with said previously mentioned inductances, a capacitance in series with said last mentioned inductance, and a plurality of circuits each comprising an inductance and a capacitance connected with said transfer inductance and the capacitance connected therewith, said inductances in said circuits having no direct coupling with said input and output circuits but each being tuned to resonance at a particular one of said discrete frequencies in combination with said transfer inductance and capacitance connected therewith, said transfer inductance and capacitance connected therewith being common to all of said circuits.

AUGUST HUND.